Dec. 9, 1924.

A. ROSNER

FRICTION CLUTCH

Filed March 31, 1920  2 Sheets-Sheet 1

Inventor:
Adolph Rosner,
by Emery, Booth, Janney & Varney
Attys.

Dec. 9, 1924.

A. ROSNER

FRICTION CLUTCH

Filed March 31, 1920   2 Sheets-Sheet 2

Inventor:
Adolph Rosner,
by Emery, Booth, Janney & Varney
Attys.

Patented Dec. 9, 1924.

1,518,604

UNITED STATES PATENT OFFICE.

ADOLPH ROSNER, OF BRIDGEPORT, CONNECTICUT, ASSIGNOR, BY MESNE ASSIGNMENTS, TO LOCOMOBILE COMPANY OF AMERICA, INCORPORATED, OF NEW YORK, N. Y., A CORPORATION OF NEW YORK.

FRICTION CLUTCH.

Application filed March 31, 1920. Serial No. 370,167.

*To all whom it may concern:*

Be it known that I, ADOLPH ROSNER, a citizen of the United States, and a resident of Bridgeport, in the county of Fairfield and State of Connecticut, have invented an Improvement in Friction Clutches, of which the following description, in connection with the accompanying drawings, is a specification, like characters on the drawings representing like parts.

This invention relates to friction clutches of the class in which a plurality of disks, engaged face to face by axial pressure, transmit power from a driving to a driven member. The invention aims to eliminate the noise which has hitherto characterized the operation of clutches of this class, due to back-lash or free play in a circumferential direction in the spline connection between the driving elements.

My invention will be best understood by reference to the following description, when taken in connection with the accompanying drawings of one illustrative embodiment thereof, while its scope will be more particularly pointed out in the appended claims.

Figure 1:
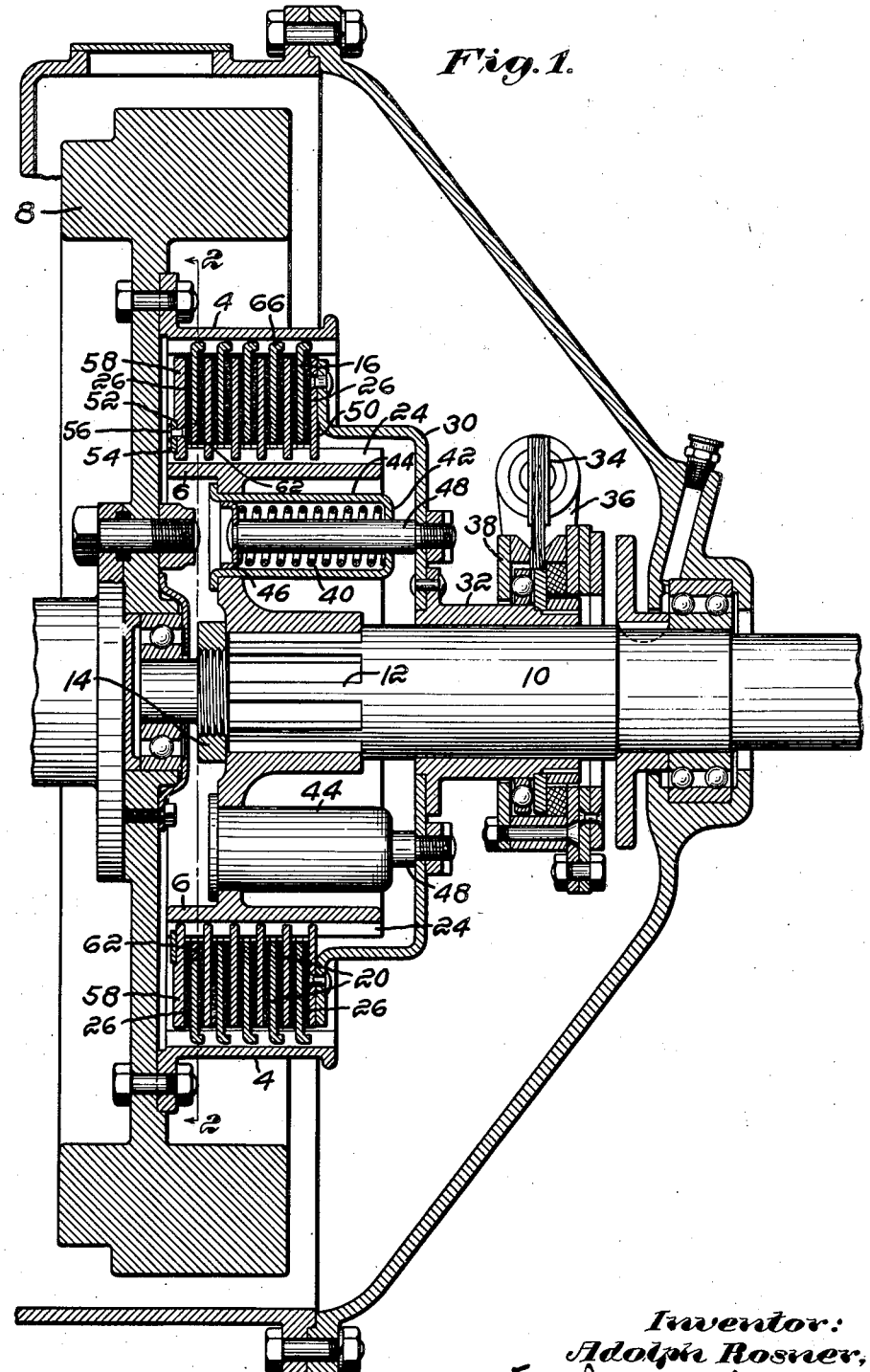
Fig. 1 is a central, vertical, longitudinal section of a multiple disk clutch exemplifying my invention.

Referring to the drawings, and to the embodiment of my invention which I have selected for exemplification, I have there shown a common form of clutch having driving and driven members 4 and 6. In the embodiment shown, the driving member is secured to a fly-wheel 8, and the driven member is suitably secured to a shaft 10, as by keys 12 and a nut 14, the latter being threaded onto the stub end of the driven shaft.

Figure 2:
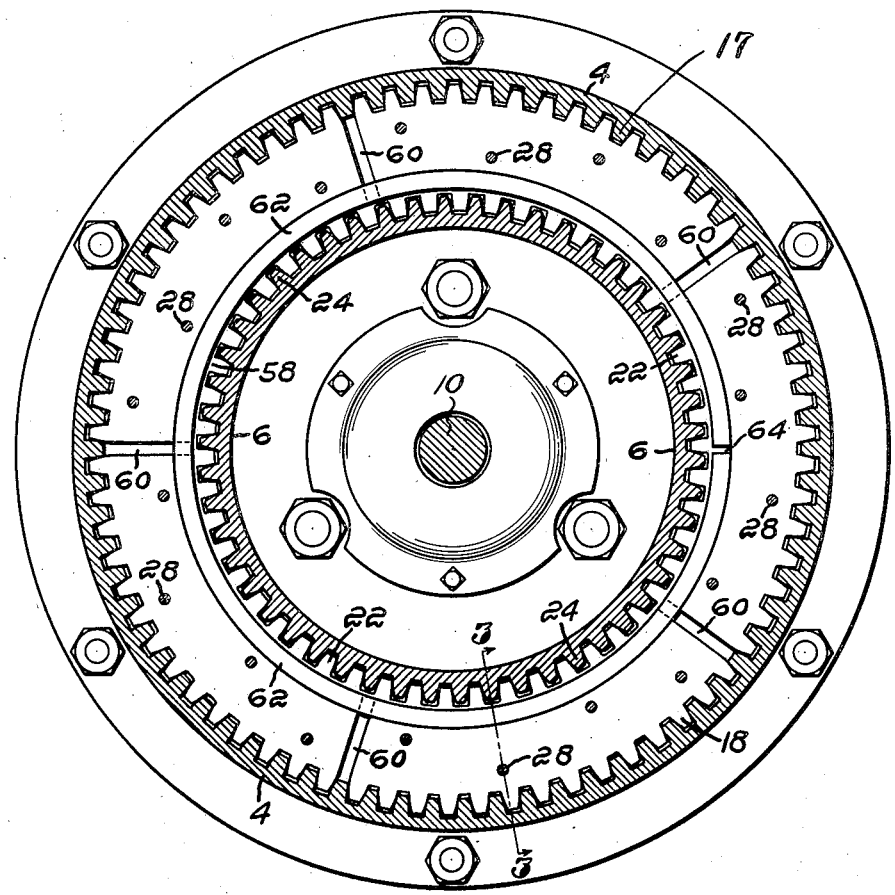
Fig. 2 is a sectional view on line 2—2 of Fig. 1.

While my invention is by no means limited to a so-called multiple disk clutch,—that is to say one having a relatively large number of thin disks,—but may be embodied advantageously in a so-called plate clutch, I have herein selected the former type for exemplification. The driving member 4 herein carries a set of driving disks 16 suitably driven thereby, as by a plurality of splines conveniently in the form of a large number of teeth 17 cut in the internal surface of the driving member, and meshing with correspondingly-shaped teeth 18 cut on the disk. Herein, the teeth are formed like those of a gear, as will be seen from an examination of Fig. 2. Similarly, the driven member 6 carries a set of driven disks 20, as by means of teeth 24 cut on the driven member and meshing with teeth 22 cut on the driven disks, such teeth also having a form similar to gear teeth.

Multiple disk clutches are of two general classes, one in which metal-to-metal disks run in a bath of lubricating oil, and the other in which the faces of the disks are faced with a suitable material such as asbestos brake and clutch lining. The clutch of the latter class, usually called a dry clutch, is herein selected for exemplification, each of the driving disks 16 being faced in the present example on both sides with rings 26 of suitable lining material such as asbestos combined with an appropriate binder such as rubber. These facing rings are herein secured to their respective disks by rivets 28.

Driving pressure of the disks against one another is suitably produced as by a pressure member, herein a disk 30 carried by a sleeve 32, the latter being mounted to slide in an axial direction on the shaft 10, and being operated by a usual rockshaft 34, yoke 36, and thrust-bearing 38, in a manner too well known to require further description. The driving pressure is furnished by one or more, herein a plurality of springs 40, each of which is seated at one end against an abutment 42, herein formed as a part of a cup-like spring casing 44, while the other end of the spring is seated against an abutment 46, herein a collar carried by a stud 48, the latter being secured to the disk 30. In order to prevent the driving load from being thrown onto the studs 48, the disk 30 herein carries a ring 50, which is splined on the teeth 24 of the driven member 6. It follows that the driven member and the pressure member rotate as one, while having provision for axial movement of the pressure member. Inward movement of the clutch member, so-called (meaning the inner group of driving and driven disks), is suitably limited, as by the provision of a suitable stop, herein a ring 52 received in a circumferential groove 54 in the driven member 6, and appropriately secured, as by rivets 56, to the innermost driven disk 58, the latter, like the other driven disks, being splined on the driven member.

Heretofore, a difficulty has been experienced with clutches of this and others of the plate or disk type, owing to the noise produced by relative circumferential movement of the splines or teeth of the driving member and driving disks, particularly when running under a light load or no load with the clutch engaged. This is sometimes manifested in motor cars when the vehicle is "drifting."—that is to say, when the momentum of the car tends to drive the engine. It is supposed that this rattling noise is due to certain torsional vibrations transmitted partly from the engine and partly from the propeller shaft, due to the use of universal joints. This occurs at certain engine speeds, especially with a light load, and the sound resembles that of the rolling of marbles. This is ordinarily overcome by an extremely close fit in the splined connections, but this closeness of fit lasts only a short time. It has been an annoying and perplexing problem to attempt to silence this noise. I have succeeded in eliminating the noise altogether, so that the clutch is silent and remains so after many thousands of miles of service. This has been accomplished by the use of the construction which I will now describe.

Figure 3:
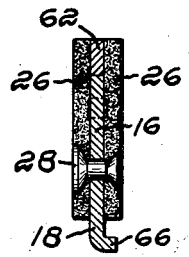
Fig. 3 is a detail sectional view on an enlarged scale on line 3—3 of Fig. 2.

One of the driving disks, preferably the innermost, next to the innermost driven disk 58, is made radially expansible under the influence of centrifugal force, so that its teeth 18 are crowded into the spaces between the teeth of the member 4. This is herein accomplished by interrupting the disk at one or more, herein a plurality of points 60 (see Fig. 2), by actually cutting the disk into a plurality of segments, five such segments being shown in the present example. Preferably, centrifugal force alone is not relied upon to urge the segments in an outward direction, particularly as this tendency would be comparatively slight at slow speeds. I have therefore provided appropriate resilient means constantly tending to urge the segments in an outward direction, such means herein consisting of a ring-like spring 62, arranged circumferentially within the segmental driving disk (see Figs. 2 and 3), and having a suitable gap, as at 64. This spring is made so that, initially, it has an outside diameter greater than the inside diameter of the segments which compose the driving disk. Hence, when the spring is put in place, it is constantly in tension, and therefore urges the segments in outward directions, thus crowding the teeth 18 into the spaces between the teeth 17 of the member 4, and preventing any back-lash or lost motion at this point. Thus, by the use of the spring and centrifugal force, taking up the clearance between the teeth 17 of the driving member and the teeth 18 of one driving disk, the one disk acts as a steadying member for all.

Because of the continued sliding of the teeth 18 to and fro along the teeth of the member 4, and the resultant wear on both sets of teeth, I have herein elongated the teeth 18 in an axial direction, as at 66 (see Fig. 1), thus giving them increased wearing surfaces, in the present example having a length substantially equal to twice the thickness of the disks. This may be accomplished by bending the ends of the teeth at right angles to the body of the disk, as well illustrated in Fig. 3. This tends greatly to increase the life of the clutch, thereby to assist in preventing back-lash, which might otherwise develop after long continued use. Moreover, after the teeth 17 have developed considerable wear, the disks may be reversed, thereby presenting the offset portions 66 of the teeth 18 at new, unworn portions of the teeth 17, thus greatly prolonging the life of the clutch.

Having thus described one embodiment of my invention, but without limiting myself thereto, what I claim and desire to secure by Letters Patent is:

1. In a power transmitting device, the combination of two parts, one splined on the other, and one transmitting power to the other through the spline connection, said parts having provision for transmitting the torque in a positive and unyielding manner while automatically taking up play in the spline connection irrespective of the sliding of one of said parts with respect to the other.

2. In a power transmitting device, the combination of two parts, one splined on the other, and one transmitting power to the other through the spline connection, said parts having provision to utilize centrifugal force to take up play in the spline connection.

3. In a power transmitting device, the combination of two parts, one splined on the other, and one transmitting power to the other through the spline connection, and constantly effective resilient means distinct from and additional to the spline connection for taking up play in the spline connection irrespective of the load in a circumferential direction.

4. In a power transmitting device, the combination of two parts, one splined on the other, and one transmitting power to the other through the spline connection, and radially acting resilient means for taking up play in the spline connection.

5. In a power transmitting device, the combination of inner and outer parts, one splined on the other, and one transmitting power to the other through the spline connection, the inner part being radially expansible under the influence of centrifugal force.

6. In a power transmitting device, the combination of inner and outer parts, one splined on the other, and one transmitting power to the other through the spline connection, the inner part being radially expansible, and resilient means tending to expand said inner part.

7. In a power transmitting device, the combination of inner and outer parts, one splined on the other, and one transmitting power to the other through the spline connection, the inner part being composed of a plurality of radially movable segments.

8. In a power transmitting device, the combination of inner and outer parts, one splined on the other, and one transmitting power to the other through the spline connection, the inner part being composed of a plurality of radially movable segments, and resilient means tending to move said segments outward.

9. In a clutch, the combination of inner and outer members, two sets of friction devices, one splined to the inner member and the other to the outer member, one device of the last-mentioned set being radially expansible under the influence of centrifugal force.

10. In a clutch, the combination of inner and outer members, two sets of friction devices, one splined to the inner member and the other to the outer member, one device of the last-mentioned set being radially expansible, and resilient means tending to expand said radially expansible device.

11. In a clutch, the combination of driving and driven disks transmitting power by frictional engagement face to face in an axial direction, a driver having splined connection with the driving disk, means to cause a pressure against one of said disks in a generally radial direction, and means to utilize said pressure to take up circumferential play in said splined connection.

12. In a clutch, the combination of driving and driven disks transmitting power by frictional engagement face to face in an axial direction, a driver having splined connection with the driving disk, resilient means to cause a yielding pressure against one of said disks in a generally radial direction, and means to utilize said pressure to take up circumferential play in said splined connection.

13. In a clutch, the combination of driving and driven disks transmitting power by frictional engagement face to face in an axial direction, a driving member having splined connection with the driving disk, a driven member having splined connection with the driven disk, and means to cause a pressure to be exerted by one of said disks against the member having splined connection therewith in a direction other than axially or circumferentially.

14. In a clutch, the combination of driving and driven disks transmitting power by frictional engagement face to face in an axial direction, a driver having splined connection with the driving disk, and means to cause a yielding pressure to be exerted by one of said disks against said driver in another direction.

15. In a power transmitting device, the combination of two parts, one splined on the other, and one transmitting power to the other through the spline connection, said parts having provision for transmitting the torque in a positive and unyielding manner while automatically taking up circumential play in the spline connection.

16. In a power transmitting device, the combination of two parts, one splined on the other, and one transmitting power to the other through the spline connection, said parts having provision to utilize centrifugal force to take up circumferential play in the spline connection.

17. In a power transmitting device, the combination of two parts, one splined on the other, and one transmitting power to the other through the spline connection, and resilient means distinct from the spline connection for automatically taking up circumferential play in the spline connection.

18. In a power transmitting device, the combination of two parts, one splined on the other, and one transmitting power to the other through the spline connection, and radially acting resilient means for automatically taking up circumferential play in the spline connection.

In testimony whereof, I have signed my name to this specification.

ADOLPH ROSNER.